United States Patent
Shamir et al.

(10) Patent No.: US 9,064,151 B2
(45) Date of Patent: Jun. 23, 2015

(54) DEVICE AND METHOD FOR DETECTING PLANTATION ROWS

(71) Applicant: Intelescope Solutions Ltd., Kiryat-Aryeh Petach-Tikva (IL)

(72) Inventors: Gil Shamir, Kfar-Saba (IL); Roi Shilo, Moshav Benaya (IL); Erez Yaacov Diamant, Herzelia (IL); Yoram Elichai, Ashdod (IL); Tsur Herman, Pardes Hanna-Karkur (IL)

(73) Assignee: Intelescope Solutions Ltd., Petach-Tikva (IL)

( * ) Notice: Subject to any disclaimer, the term of this patent is extended or adjusted under 35 U.S.C. 154(b) by 103 days.

(21) Appl. No.: 13/871,379

(22) Filed: Apr. 26, 2013

(65) Prior Publication Data
US 2014/0099000 A1 Apr. 10, 2014

Related U.S. Application Data

(60) Provisional application No. 61/709,624, filed on Oct. 4, 2012.

(51) Int. Cl.
| | |
|---|---|
| *G06K 9/00* | (2006.01) |
| *G06K 9/32* | (2006.01) |
| *G06K 9/62* | (2006.01) |
| *G06T 3/00* | (2006.01) |
| *A01C 5/00* | (2006.01) |

(52) U.S. Cl.
CPC .......... *G06K 9/00657* (2013.01); *G06K 9/3233* (2013.01); *G06K 9/6267* (2013.01); *G06T 3/00* (2013.01)

(58) Field of Classification Search
CPC .................................. G06K 9/00; G06T 3/00
USPC ............... 382/110; 111/52, 69, 100, 114, 199
See application file for complete search history.

(56) References Cited

U.S. PATENT DOCUMENTS

2012/0114185 A1* 5/2012 Ram et al. ..................... 382/110

OTHER PUBLICATIONS

C. Delenne et al. "Vine Plot detection in aerial images using fourier analysis", Proceedings 1st International Conference on Object-based Image Analysis, Jun. 4, 2006, p. 1-6, Austria.
Delenne C et al. "An Automatized frequency analysis for vine plot detection and delineation in remote sensing", IEEE Geoscience and Remote Sensing Letters, IEEE Service Center, New York, NY, US, vol. 5, No. 3, Jul. 1, 2008, pp. 341-345.
International Search Report for PCT International Patent Application No. PCT/IL2013/050600, mailed Mar. 27, 2014.

* cited by examiner

*Primary Examiner* — Abolfazl Tabatabai
(74) *Attorney, Agent, or Firm* — Pearl Cohen Zedek Latzer Baratz LLP

(57) ABSTRACT

A device and method for identifying plant rows in a field represented by an image is provided. The plant rows may be identified using the frequency domain. The plant rows may further be identified using information regarding plant positions. Additionally, plant rows may be obtained by any appropriate method and analyzed to differentiate between planted and non-planted rows. Further, plant rows may be segmented according to predefined classifications or attributes thereof, wherein the classification/attributes may derived from an image of the area in which the plant rows are found and/or using any other appropriate method.

20 Claims, 12 Drawing Sheets

DEVICE AND METHOD FOR DETECTING PLANTATION ROWS

PRIOR APPLICATION DATA

The present application claims benefit from prior provisional application U.S. Provisional Patent Application No. 61/709,624, filed on Oct. 4, 2012, which is incorporated by reference herein in its entirety.

BACKGROUND OF THE INVENTION

The ability to classify various sub-areas in a field represented by an image, e.g., an aerial image, could be useful for various purposes, such as the classification of areas according to the land uses.

Foresters, in particular, are often required to inventory their plantations in order to quantify the volume of wood and project future wood supply upon harvest. The inventory is usually conducted by sampling plots in the actual forest, where performing statistical extrapolation of data collected in the plots produces the forest inventory estimation.

There are various methods of designing the forest samples, some using fixed and others variable, areas. For forest inventory, circular and rectangular plots are commonly used for sampling. The ratio between the areas of the samples and the population the samples represent serve as the statistical estimator for calculations.

Plotting the actual sample areas in the forest may consume significant time and labor. Moreover, when the timber population of interest is an artificial plantation that has well defined planting rows, it is likely that area sampling units show high variability among themselves and hence result in inaccurate estimates of population parameters. This could produce relatively inaccurate timber inventory.

Therefore, it may be beneficial to use row-segments as the sample units. In such a case, the estimator for calculation can be the ratio between the sample linear length and the total linear length of planted rows of the represented population. This could be beneficial in providing easier movement along planting rows and saving the time and effort of defining aerial samples across rows. The results are likely to be more accurate due to the lower sample unit to sample unit variability, which could also allow smaller samples for an equivalent statistical accuracy.

Such a method may be applicable to any plantation, including, but not limited to orchards, vines, citrus, forests, etc. Such a method may also be applicable to any rows-based agricultural application and/or any application of positioning items in an order based on rows, either straight or curved. In cases where planting is conducted using automated planting machines that use GPS (Global Positioning System) equipment, the recording of the planting machine's path could produce the planting rows map, and enable their length measurement. However, this method is only applicable for some plantations and mandate recording of planting rows during plantation. For existing plantations, such information often does not exist.

One alternative way of obtaining the total length of the represented population might be the measurement of planted rows in the forest. However, this method involves significant manual labor and may not be economically feasible. In cases where an aerial image of the plantation exists, image analysts could manually detect and mark the plantation rows, thereby enabling their length measurement. However, this too involves significant manual labor and might not be economically beneficial. Manual methods are also prone to human errors.

There is therefore a need in the art for a system and method to enable accurate and efficient row-identification over large plantation areas.

SUMMARY OF THE INVENTION

Embodiments of the invention are directed to a method including producing a frequency domain representation of a digital image that includes plants and identifying at least one desired patch in the frequency domain representation, according to predefined frequency characteristics of the desired patch. The method may further include removing all frequencies outside the desired patch to obtain a masked frequency domain; and reverse transforming, by a computing device, the masked frequency domain to obtain a reverse transformed image comprising spatial elements representing plant rows corresponding to the desired patch. According to some embodiments, the predefined frequency characteristics include at least one dominant frequency value, at least one predefined frequency characteristic corresponding to at least one predefined spatial characteristic relating to at least one attribute of the plants; or any combination thereof. According to further embodiments, the attribute of the plant is planted row spacing, spacing between plants on the same row, direction of plant rows, typical row samples manually marked on the aerial image providing any of the above attributes, or any combination thereof.

Further embodiments of the invention are directed to a device that includes a memory and a processor that may produce a frequency domain representation of a digital image including plants and identifying at least one desired patch in the frequency domain representation, according to predefined frequency characteristics of the desired patch. According to further embodiments, the processor may remove all frequencies outside the desired patch to obtain a masked frequency domain and may reverse transform, by a computing device, the masked frequency domain to obtain a reverse transformed image comprising spatial elements representing plant rows corresponding to the desired patch. According to some embodiments, the predefined frequency characteristics include at least one dominant frequency value, at least one predefined frequency characteristic corresponding to at least one predefined spatial characteristic relating to at least one attribute of the plants or any combination thereof. According to further embodiments, the attribute of the plant is planted row spacing, spacing between plants on the same row, direction of plant rows, typical row samples manually marked on the aerial image providing any of the above attributes, or any combination thereof.

Further embodiments of the invention are directed to a method that may include assigning a vector to each plant in a predefined area according to its position, the position of neighbor plants, the distance between the plant and the neighbor plants, and the direction of a line formed by the plants and the neighbor plants. The method may further include associating the plants with curved lines, according to the vectors, to obtain estimated rows, extending the estimated rows in the direction defined by the curved lines, to obtain extended rows and defining a line connecting a first and second extended row having a common orientation, when the plants positioned on the line have a predefined density to obtain intermediate rows having a position and an orientation. The method may further include predicating rows parallel to any one of the intermediate rows, according to the position and orientation of intermediate rows, to obtain predicated parallel plant rows, grouping plant rows, that include intermediate plant rows and predicated parallel plant rows, into groups and removing intersecting groups, thereby obtaining plant rows.

Further embodiments of the invention are directed to a device comprising a memory and a processor, wherein the processor may assign a vector to each plant in a predefined area according to its position, the position of neighbor plants, the distance between the plant and the neighbor plants, and the direction of a line formed by the plants and the neighbor plants. According to some embodiments the processor may further associate the plants with curved lines, according to the vectors, to obtain estimated rows, extend the estimated rows in the direction defined by the curved lines, to obtain extended rows and define a line connecting a first and second extended row having a common orientation, when the plants positioned on the line have a predefined density to obtain intermediate rows having a position and an orientation. According to some embodiments the processor may further predicate rows parallel to any one of the intermediate rows, according to the position and orientation of intermediate rows, to obtain predicated parallel plant rows. The processor may further group plant rows, including intermediate plant rows and predicated parallel plant rows, into groups and remove intersecting groups, thereby obtaining plant rows.

Further embodiments of the invention are directed to a method that includes obtaining plant rows in a predefined area, wherein the plant rows are represented by spatial elements corresponding a at least one frequency patch, polylines or curves, obtaining, by an image acquisition system, an image of the pre-defined area and dividing the spatial elements, polylines or curves into segments according to pre-defined classifications relating to attributes of the image.

Further embodiments of the invention are directed to a device including a memory having stored thereon a representation of plant rows in a predefined area, wherein the plant rows are represented by spatial elements corresponding a at least one frequency patch, polylines or curves and an image of the predefined area. The device may further include a processor to divide the spatial elements, polylines or curves into segments according to pre-defined classifications relating to attributes of the image.

Further embodiments of the invention are directed to method that may include obtaining plant rows in a predefined area, wherein the plant rows are represented by spatial elements corresponding a at least one frequency patch, polylines or curves, obtaining, by an image acquisition system, an image of the pre-defined area and distinguishing between spatial elements, polylines or curves representing planted and non-planted rows according to height attributes derived from the image, color of areas in the image, pattern of areas in the image or any combination thereof.

Further embodiments of the invention are directed to a device including a memory having stored thereon a representation of plant rows in a predefined area, wherein the plant rows are represented by spatial elements corresponding a at least one frequency patch, polylines or curves and an image of the predefined area. The device may further include a processor to distinguish between spatial elements, polylines or curves representing planted and non-planted rows according to height attributes derived from the image, color of areas in the image, pattern of areas in the image or any combination thereof.

Further embodiments of the invention are directed to a method that may include obtaining plant rows in a predefined area, wherein the plant rows are represented by spatial elements corresponding a at least one frequency patch, polylines or curves, obtaining attributes of the predefined area comprising height, surface color, vegetation class, soil data or any combination thereof and distinguishing between spatial elements, polylines or curves representing planted and non-planted rows according to the attributes. According to some embodiments, the attributes are not derived from an image of the predefined area.

Further embodiments are directed to a device including a memory having stored thereon a representation of plant rows in a predefined area, wherein the plant rows are represented by spatial elements corresponding a at least one frequency patch, polylines or curves and attributes of the predefined area comprising height, surface color, vegetation class, soil data or any combination thereof. The device may further include a processor to distinguish between spatial elements, polylines or curves representing planted and non-planted rows according to the attributes. According to some embodiments, the attributes are not derived from an image of the predefined area.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which:

FIG. 1b is the FFT image corresponding to the plot of trees presented in FIG. 1a.

FIG. 2a shows an exemplary plot of trees having detectable rows and FIG. 2b is the FFT image corresponding to the plot of trees presented in FIG. 2a.

Figure 1A:
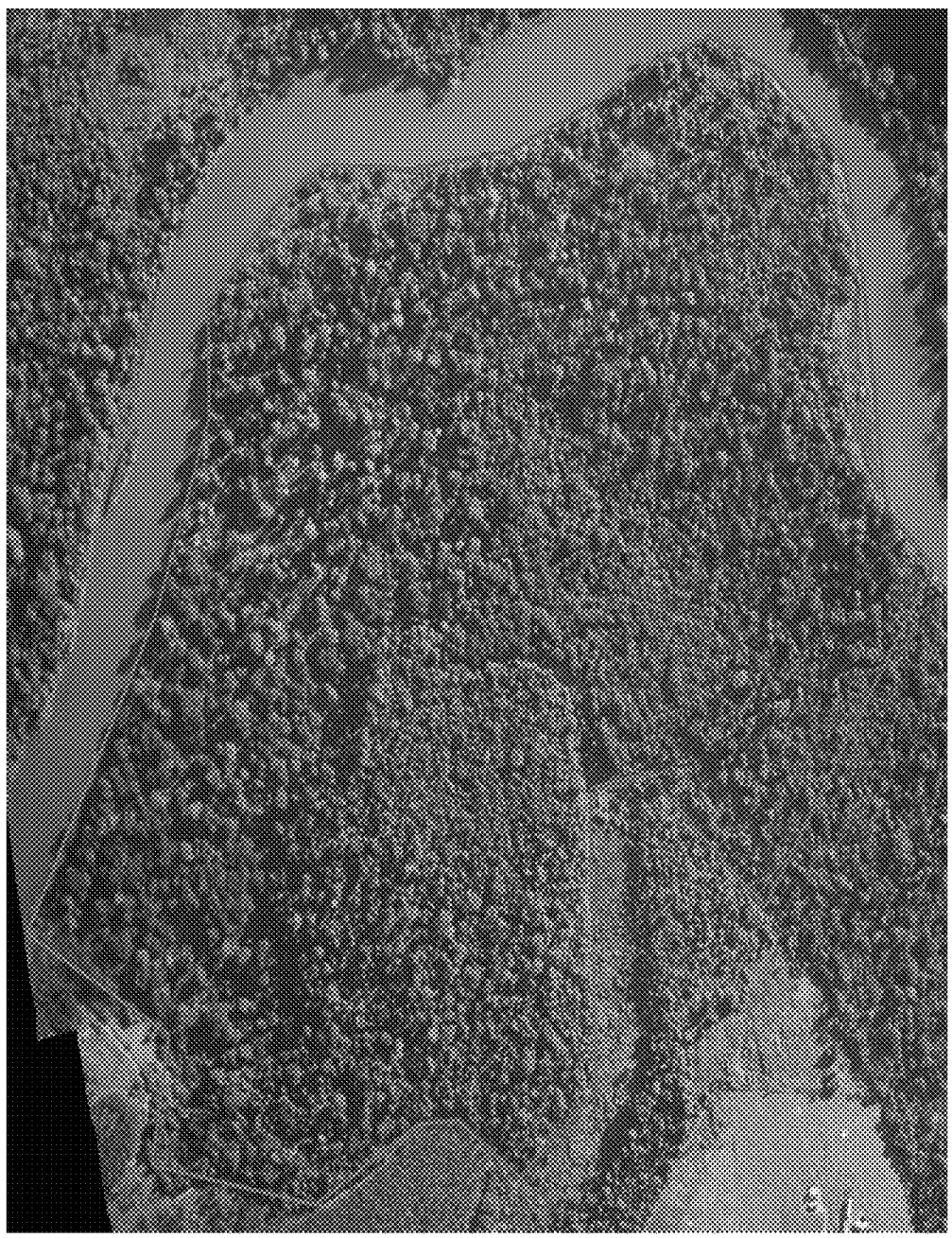
FIG. 1a shows an exemplary random plot of trees in which no particular rows are detected.
Figure 1B:
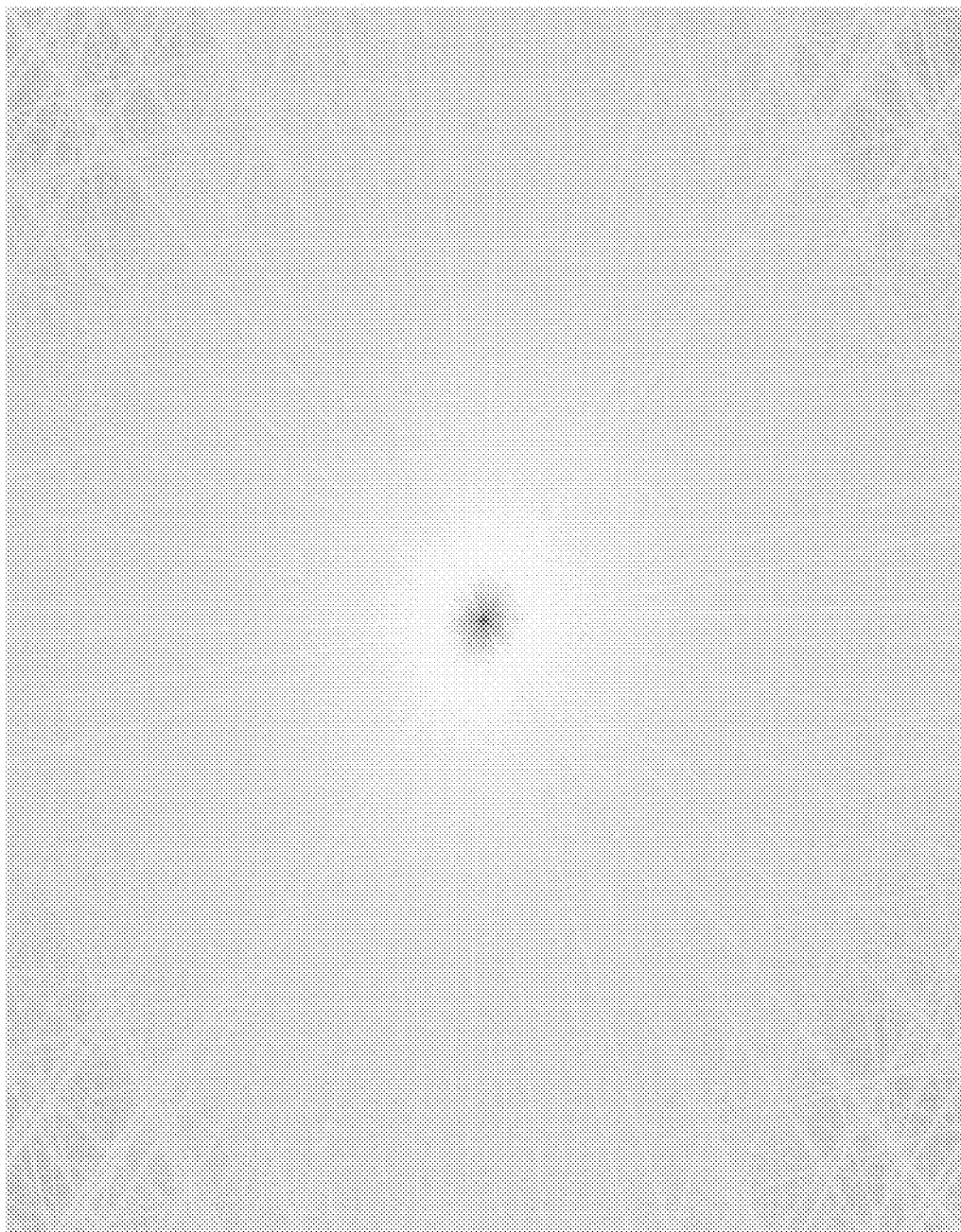

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like.

Unless explicitly stated, the method embodiments described herein are not constrained to a particular order or sequence. Additionally, some of the described method embodiments or elements thereof can occur or be performed at the same point in time.

Unless explicitly stated, the methods of the invention relate to any sub-areas of a field, as detailed below. A field may be for example any predefined geographical area or region. Any indication of specific sub-areas in the image, such as tree rows, should be considered to be generalized to any type of sub-area.

According to some embodiments, a method includes dividing a field/area represented in an image, e.g., an aerial image, into different types of sub-areas using any appropriate type of frequency detection engine. The sub-areas may be distinguished from one another according to any characteristics thereof. For example, two different types of sub-areas may be planted and non-planted sub-areas. The sub-areas may also, for example, represent areas having different density of vegetation. According to some embodiments, any of the sub-areas may be defined or labeled as rows of trees, thus enabling the detection of rows of trees from images, e.g., aerial images, using a frequency detection engine, e.g., utilizing the image frequency domain. The frequency, as related to herein, may correspond to physical occurrences in the spatial image, such as tree rows, single trees, leaves, etc. When transforming from the spatial domain to the frequency domain, such physical occurrences appear as peaks or patches in the frequency domain. As detailed herein, FIGS. 1a, 1b, 2a and 2b show the frequency domains corresponding to the spatial domains, wherein the peaks or patches, when generated, present the tree rows, since those rows are the most dominant occurrence in the spatial domain.

The aerial images may include aerial optical photographs in any spectral region, including visible light, infrared, near-infrared, etc. According to some embodiments, the aerial images may include any type of satellite images, e.g., optical or radar images. The aerial images may further include images generated by light detection and ranging (LiDAR) 3-dimensional point clouds or from any other appropriate point clouds. Accordingly, any image acquisition device may be used in order to acquire images processed as described herein without departing from the scope of the invention.

In order to utilize the frequency domain, predefined frequency characteristics, according to which frequency patches, which may be area patches in the frequency domain image that correspond to the desired spatial sub-areas, e.g., tree rows, may be identified. One such characteristic may be the dominant frequency patch, or dominant frequency value, corresponding to the desired sub-areas, assuming that the desired sub-areas are more dominant in the frequency domain than other sub-areas found in the spatial image. For example, it may be assumed that tree rows are more dominant in the frequency domain than other types of sub-areas, such as single trees, leaves, etc. According to some embodiments, a patch may include one dominant peak or frequency value or more than one peak or frequency value. When used herein a patch may be a sub-section or portion of an image in the frequency domain.

Additional predefined frequency characteristics may include frequency characteristics corresponding to spatial characteristics that may relate to at least one attribute of the plants appearing in the spatial image, such as planting distance between rows, distance between plants in the same row, the direction of the planted rows, typical row samples manually marked on the aerial image providing any of the above attributes or any other type of information that may be gathered regarding the plants in the field. Any combination of such attributes may also be utilized. Such data may be gathered from the field itself, from databases having information regarding the field, or from any other appropriate source, such as the planting plans. The method may include, according to some embodiments, manually or automatically analyzing the aerial image and/or may utilize sub-area characteristics, e.g., planted area characteristics, such as rows and planted tree spacing, typical row samples manually marked on the aerial image and/or frequency specifications in order to extract row data. For example, data regarding distance between rows and the direction of the rows may be gathered by manually marking at least two rows on the aerial image and deriving the direction and distance between rows therefrom. When discussed herein, plants are living organisms of the kingdom plantae.

Spatial characteristics detected/identified in the image may be transformed into the frequency domain and accordingly, the desired frequency patches may be identified. According to some embodiments, any combination of the frequency characteristics, including frequency dominance and characteristics stemming from spatial attributes of the plants in the field, may be utilized to identify a frequency patch.

According to some embodiments, an image frequency domain may be determined using Fourier transform or wavelet transform. Generally, every point in a two dimensional Fourier transform (FT) or fast Fourier transform (FFT) of an image corresponds to a certain orientation and frequency of regular lines in the spatial domain. Any references herein to FFT may be substituted with FT. A perfectly regular straight-line pattern would produce an FFT with sharp peaks at a single point, and in its harmonics. A slightly curved, nearly periodic, polyline formation would produce a patch around the mean frequency and mean orientation in the corresponding FFT image. Since tree rows tend to be imperfect polylines, an embodiment of the invention may determine a frequency patch corresponding to the tree rows in the spatial domain.

Figure 2A:
Figure 2B:
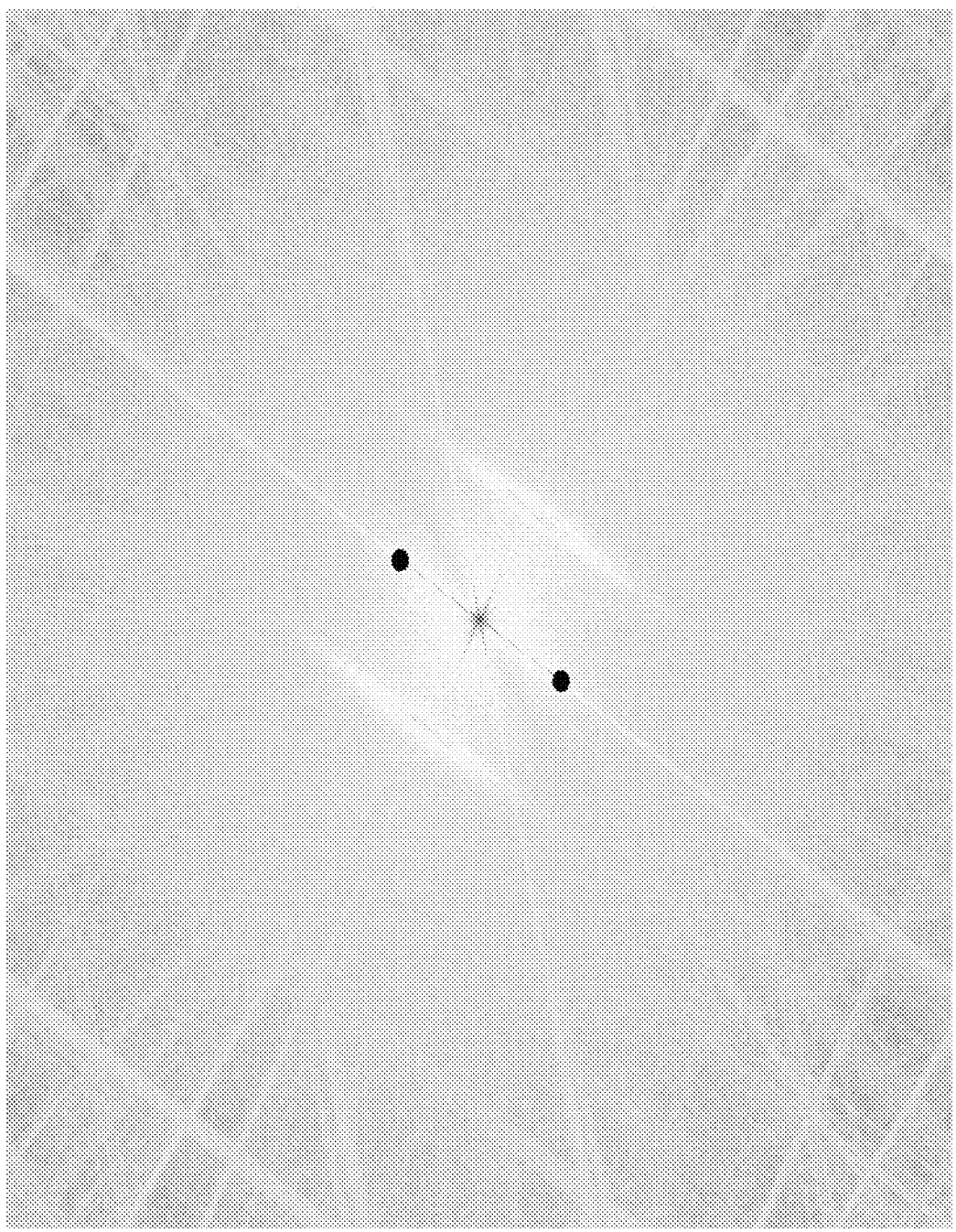

An aerial photo of a planted area may be thought of as comprising slow varying information (based on the illumination), row formations and finer grained details (single tree details). Thus, according to some embodiments, the identification of the correct patches, e.g., the ones corresponding to tree rows, in the FFT image of an aerial image, may be used to detect the underlying row pattern of the trees. Reference is made to FIG. 1a, presenting an exemplary plot of trees where no rows are detected and to FIG. 2a, presenting an exemplary plot of trees where rows are detected. Accordingly, the peaks found in the FFT images of the two presented plots are different. The FFT image in FIG. 1b corresponds to the "rowless" plot presented in FIG. 1a and, accordingly, does not include peaks. The FFT image presented in FIG. 2b correspond to the plot presented in FIG. 2a, which includes rows, and therefore, two peaks appear in FIG. 2b.

According to some embodiments, a method for identifying plant rows includes:

Possibly applying a filter, e.g., a fast high pass filter, to the aerial image, in order to eliminate the slow varying illumination information, to obtain a filtered aerial image;

Applying a fourier transform to transform the filtered aerial image into the frequency domain to obtain an FFT image;

Roughly identifying a desired patch in the FFT image according to input, e.g., user input, related to plantation rows to obtain a starting point;

Identifying a patch center according to the starting point;

Identifying a patch according to the patch center utilizing frequency classification methods appropriate for non-uniform plantation rows;

Removing all frequencies found outside the patch, thereby obtaining a masked frequency domain that is an FFT image including only the patch frequencies;

Reverse transforming the FFT image including only the patch frequencies, thereby obtaining an inverse FFT image, related to herein also as a reverse transformed image;

Possibly applying an image stretch operation to the inverse FFT image to obtain a stretched image;

Applying a threshold to the stretched image and transferring the stretched image to black and white, gray scale or any type of single band image, according to the threshold to obtain an image comprising white background components and black row components that may be comprised of connected pixels, related to also as connected pixel components;

Thinning the black row components to single pixel components, thereby obtaining pixel represented rows; and Transforming the pixel represented rows to a pattern of sub-area polylines representing plant rows, such that they lay on the center of plantation rows in the spatial domain.

The reverse transforming related to herein may be, for example, any appropriate operation for converting an image from the frequency domain, where each pixel may be representing a frequency and its direction, to a gray level image domain, which may be a digital physical image of any area or region, where each pixel may represent a position in the area/region.

The stretching related to herein may be, for example, any appropriate image stretching. Such stretching may modify the contrast of the image by enlarging the existing gray level range to a maximal range. For example, from level "0" to level "255". Each pixel gray level (color) may be changed according to the ratio between the existing gray range and the maximal gray range.

The thinning related to herein may be, for example, a process that converts an elongated set of pixels, a black area for example, into the skeleton of the set of pixels, or area. The skeleton may a set of pixels that is a subset of the original elongated set, such that the subset pixels appear also in the original elongated set, wherein each pixel in the subset is located at a middle point between the edges of the original area, represented by the elongated set of pixels. Any appropriate means may be used in order to detect the skeleton subset, which may result in thinning the original elongated set of pixels, leaving only the skeleton. According to some embodiments, single processes or iterative processes are used to thin the original elongated area, until only the skeleton pixels remain.

According to some embodiments, the step of thinning the black row components to single pixel components and the step of transforming the pixel represented rows to polylines that lay on the center of plantation tree rows may be replaced by any appropriate polyline extraction method, such as a center pixel based method, a pixel cluster based method or a boundary pixel based method.

Input may be received by the system, e.g., automatically or by the user, in order to roughly identify the desired patch. The input may be related to the plantation rows and may include, for example:

i. the maximal value in the FFT image;

ii. predefined data regarding the estimated distance between rows, distance between trees within rows and/or row directions that may be transformed into the frequency domain;

iii. predefined manual data obtained by manually marking at least two rows in the spatial image, wherein the mean distance and mean orientation of those rows may be calculated and transformed into the frequency domain; or any combination thereof.

Such input allowed the starting point to be identified, e.g., the maximal value in the FFT image is the starting point. As detailed herein, once the starting point is identified, the patch center may be exactly identified. According to some embodiments, the patch center may be identified by using a search window of ±N degrees in orientation and ±M % of frequency around the starting point. Such a procedure identifies the patch center as well as an area around the patch center that may be included in the patch. According to some embodiments, N may be up to 30 degrees. According to some embodiments, M may be up to 30%.

The patch may be identified according to the patch center by utilizing any appropriate frequency classification/segmentation method, such as search known as Peak Search and Major Frequency Search. For example, the following operations may be used for identifying the patch from the patch center (as with other embodiments disclosed herein, different operations or combinations of operations are used):

a. defining a search window around the patch center;

b. calculating a median value of the pixels in the search window;

c. filtering out (e.g., removing) pixels in the search window having a value less than the median value and marking those pixels as "non-patch";

d. clustering the remaining pixels into "I" clusters according to their value;

e. calculating the mean value of each cluster;

f. marking the biggest cluster as "non-patch";

g. marking any cluster having a mean value smaller than the biggest cluster's mean value as "non-patch";

h. marking the cluster with the highest mean value as "patch";

i. marking the remaining clusters as "unknown"; and j. applying segmentation refinement algorithms to the results of steps (a)-(i) to obtain a mask, wherein the mask covers all frequencies found outside the patch.

It is noted that the exact identification of the patch may be particularly of importance in images having significant variation in frequency and orientation of lines, e.g., low uniformity of plantation rows.

According to some embodiments, I is between 1 to 10. According to some embodiments I=6.

According to some embodiments, the stretched image may be transformed to a black and white image using the simple threshold 0.

According to some embodiments, the method is fully automatic. According to further embodiments, the method is semi-automatic, according to which the output of the method may be further fine-tuned manually. According to some embodiments, the output is fine-tuned by manually mounting a set of polylines, each mounted over a row of planted trees.

Figure 3:
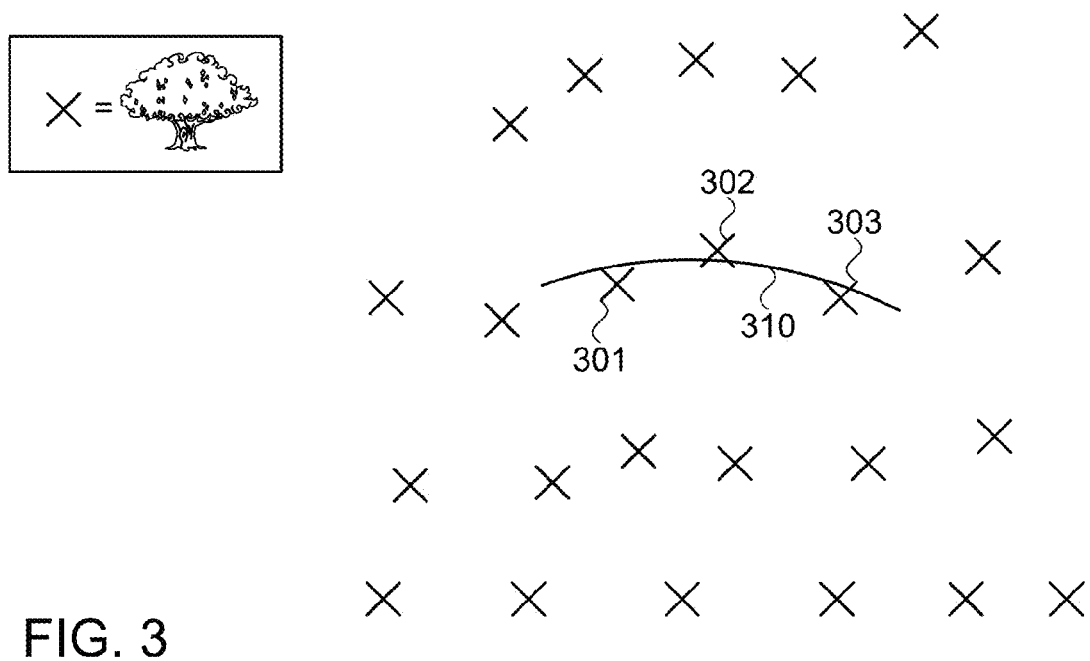
FIG. 3 shows an exemplary distribution of trees in an area and an estimated tree row.

According to some embodiments, the method includes detecting rows of trees from known tree positions. According to such an embodiment, the rows are locally straight, the trees planted within each row may be relatively uniformly distanced from one another and/or the typical distance between the rows may be not smaller than the typical distance between the trees in each row. The tree positions may be predetermined by any appropriate method, including forest mappings, aerial image positioning, manually gathered data, the method detailed in US published application 2012/0114185 (Ram et al., "System and method for inventorying vegetal substance", filed Nov. 9, 2010 and published May 10, 2012), and the like. Reference is made to FIG. 3, representing tree positions, e.g., tress 301, 302 and 303 in a predefined area.

An embodiment of the method for detecting rows of plants, e.g., trees, in a field comprising plant positions may include for example:

determining the neighbors of each plant and the direction of the row each plant belongs to and assigning a vector to each plant accordingly;

optimizing the direction of vectors assigned to the row each plant belongs to according to the direction of its neighbors;

estimating the rows by sequencing the vectors assigned to the plants using curves, according to the results of the optimization, to obtain estimated rows;

extending the estimated rows in the direction defined by the curved lines to obtain extended rows;

connecting every two extended rows that have a common orientation and may be connected by a straight line, wherein the plants positioned on the straight line have a predefined density to obtain intermediate plant rows;

predicating rows parallel to any one of the intermediate plant rows, according to the position and orientation of each one of the intermediate plant rows, using a maximal predefined distance between a predicated parallel row and any one of the intermediate plant rows, to obtain predicated parallel plant rows;

measuring the quality of the plant rows, including both the intermediate plant rows and the predicated parallel plant rows, according to the distance of the plants belonging to the curve from the curve;

grouping the plant rows into groups according to their distance from one another and their relative directions; and removing intersecting groups according to the quality of the rows in each group eliminating multiple plants that belong, initially, to both groups.

According to some embodiments, a local directions map may be built by dividing the entire field into cells, e.g., square cells of N*N meters, and determining the dominate direction of the curves (plants) derived from the above method that cross each of the cells. Such a local directions map may be used as a-priori data determining the direction of the plants in the field, which may be used as input for determining the rows according to the method detailed above. The results of the method may be more accurate when more iteration may be used, wherein the input of each iteration includes the output of the previous iteration. Such iterations may be important particularly when the direction of the plant is not initially known from an external source.

Embodiments of a method for detecting plant, e.g., tree, rows may include determining the neighbors of each tree and the direction of the row each tree belongs to. For example, according to one embodiment, for each tree p∈T, all of the tree couples/pairs (q, s)∈T may be found, wherein:

the distance between q and s, denoted as d(q,s), may be less than 2d, wherein 2d is a distance between a tree and a curve.

q, p, and s are approximately on the same straight line, wherein the vector $\hat{v}_{qs}$ denotes the direction of the straight line;

p may be approximately in the middle of [q,s], such that $\|d(q,p)-d(s,p)\| \leq d1$, wherein d1 is a function of the planting distance;

When the planting distance is known it may be required that $\|d(s,p)-dp\| \leq d2$ and $\|d(q,p)-dp\| \leq d2$, wherein d2 is a function of the planting distance;

When the planting direction in the vicinity of p is known, it may be required that $\hat{v} \cdot \hat{v}_{qs} \leq d3$, wherein d3 matches the general direction of the curve.

If at least one (q,s) couple is found that fulfils the above conditions, state (p)=1.

As further detailed herein, the method for detecting tree rows may include optimizing the direction of the row of each tree according to the direction of its neighbors, such that the certainty of the direction of tree "p" may be higher if it is compatible with the direction of its neighbors "q" and "s". Thus, for each tree p∈T, if state (p)==1, as defined above, and for each pair of neighbors (q,s) determined above that fulfill state(s)==1 and state (q)==1, wherein tree "p" is one of the two neighbors of trees "q" and "s", state (p)=2.

Reference is made to FIG. 3, presenting estimated row 310, obtained by sequencing trees 301, 302 and 303, which may be sequenced according to the results of the optimization of the direction of the row each tree belongs to according to the direction of its neighbors.

As detailed above, predicated parallel tree rows may be obtained using a maximal predefined distance between a predicated parallel row and any one of the intermediate tree rows. According to some embodiments, the maximal predefined distance may be [0.5·d, 2·d], wherein d is the planting distance, i.e., the distance between each two successive plants in a row.

According to some embodiments, once the intermediate tree rows and the predicated parallel tree rows are obtained, the quality of each tree row may be measured. The quality of the tree rows may be defined as a weighted sum of the trees along the row, wherein the weight of each tree may be a function of the distance thereof from the curve defining the row. According to some embodiments, the quality of a tree row, designated as curve "1", may be defined as $$P(l) = \frac{1}{\|l\|} \sum_{p \in T} w(d(p, l)),$$

wherein d(p,l) is the distance of tree "p" from curve "1". If d(p,l)=0, w(d(p,l))=1 and if d(p,l)>0.25d, w(d(p,l))=0. When d(p,l) is between 0 and 0.25, w(d(p,l)) is defined as being equal to d(p,l).

According to some embodiments, the tree rows are split into groups according to their distance from one another and their relative directions. For example, a tree row defined by curve "1" may be added to group $L_i$ if there is at least one curve in $L_i$ that is parallel and is in a predefined proximity to curve "1".

Figure 4:
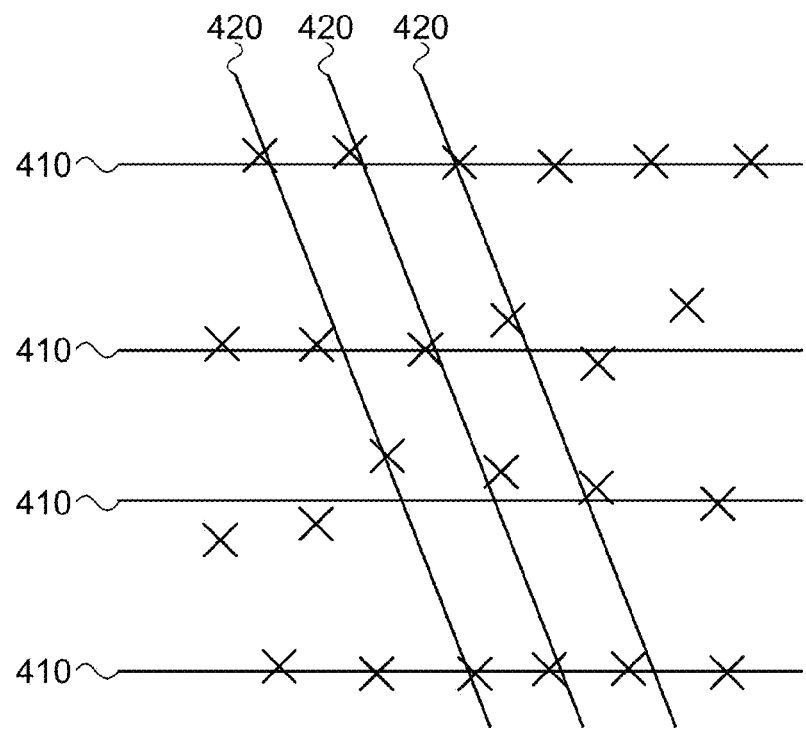
FIG. 4 shows an example of two tree row groups, which intersect one another.

Reference is made to FIG. 4, showing tree row groups 410 and 420, which may be identified according to the method detailed herein.

Figure 5:
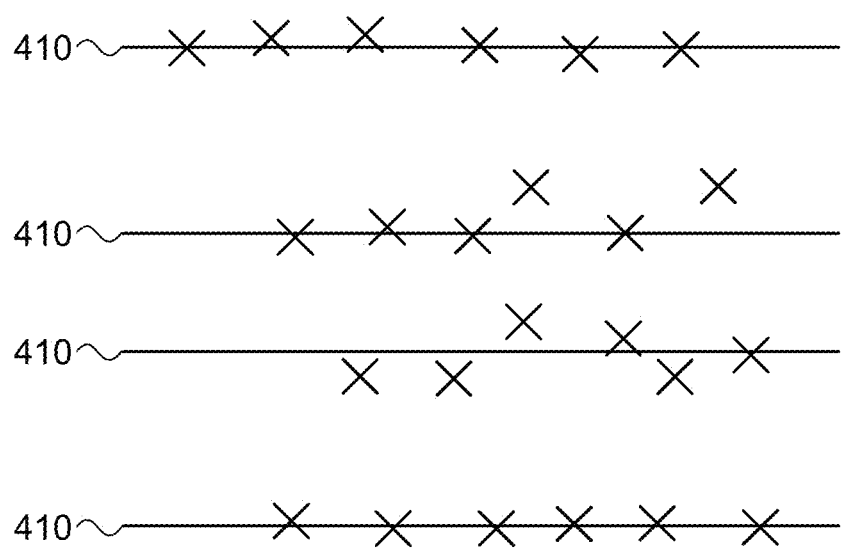
FIG. 5 shows an example of one tree row group remaining after the intersecting group presented in FIG. 4 was removed.

Plant rows may be typically closely parallel and therefore, should not intersect one another, therefore, if there are two or more groups that intersect, at least one group should be removed in order to eliminate any intersections. As shown in FIG. 4, showing row group 410 and row group 420, which intersect one another. Therefore, once the tree rows are split into groups, intersecting groups may be removed, for example, group $L_i$ may be removed if there is at least one group $L_j$ that satisfies the following conditions: $VOL(L_j) \cap VOL(L_i) \neq$, wherein VOL(X) is the volume, or content, of group X and $P(L_j) > P(L_i)$, wherein $P(L_i)$ is the quality of group $L_i$, defined as the sum of qualities of all curves belonging to group $L_i$. For example, in FIG. 5, presenting row group 410, which remains after row group 420, appearing in FIG. 4, was removed.

Once intersecting groups are removed, a local directions map may be obtained by dividing the field into N*N meter square cells and determining the dominate direction of the curves crossing each cell, wherein N is a predefined parameter dependent, e.g., on the quality of the figure, the direction of the row, etc.

Figure 6:
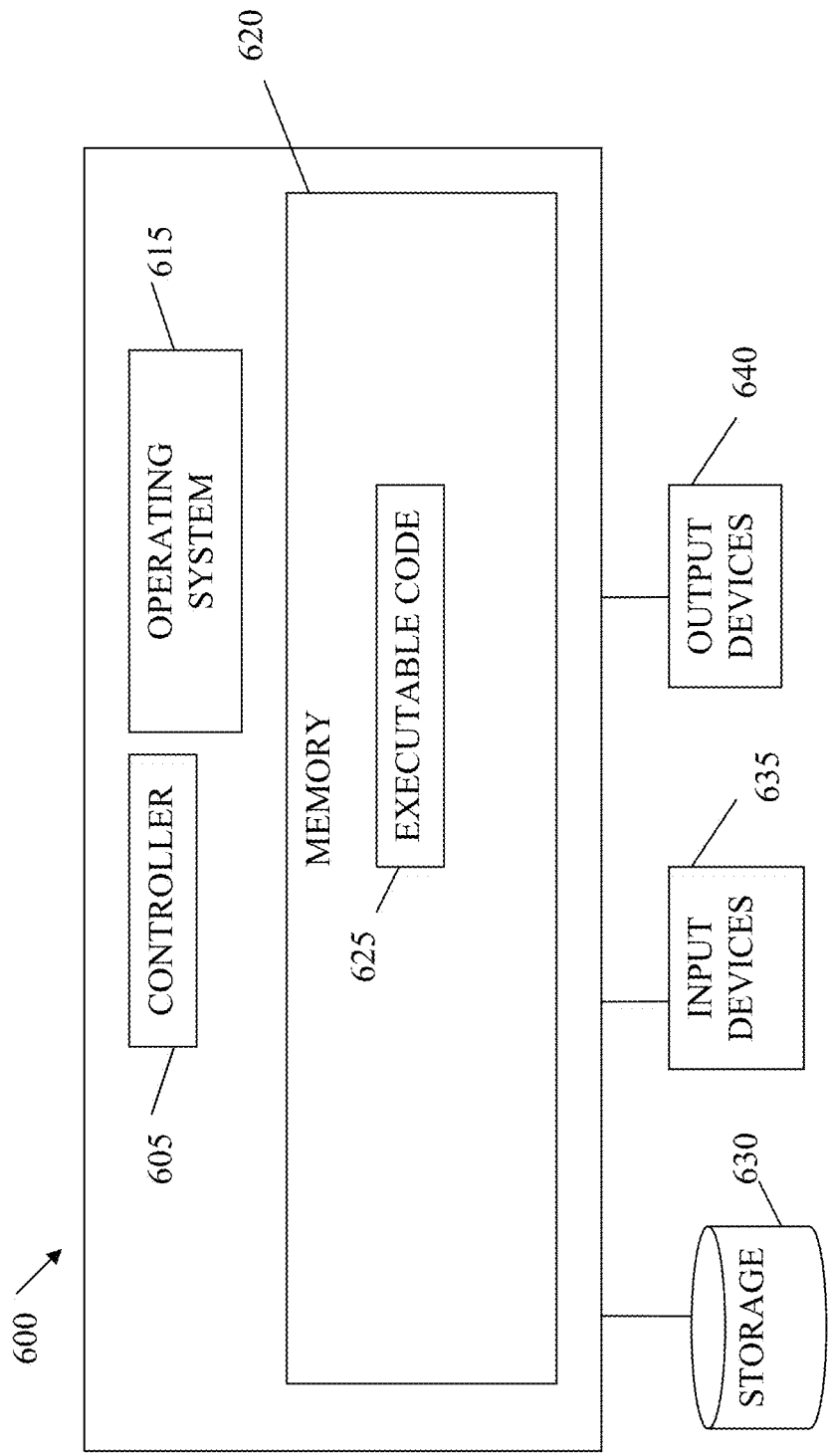
FIG. 6 shows a high level block diagram of an exemplary computing device according to embodiments of the invention.

Reference is made to FIG. 6, showing high level block diagram of an exemplary computing device according to embodiments of the present invention. Computing device 600 may include a controller 605 that may be, for example, a central processing unit processor (CPU), a chip or any suitable computing or computational device, an operating system 615, a memory 620, a storage 630, an input devices 635 and an output devices 640.

Operating system 615 may be or may include any code segment designed and/or configured to perform tasks involving coordination, scheduling, arbitration, supervising, controlling or otherwise managing operation of computing device 600, for example, scheduling execution of programs. Operating system 615 may be a commercial operating system. Memory 620 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 620 may be or may include a plurality of, possibly different memory units. Memory 620 may store data such as images or representations of plants, representations of plant rows in a predefined area, images of predefined areas, and other data used by embodiments described herein.

Executable code 625 may be any executable code, e.g., an application, a program, a process, task or script. Executable code 625 may be executed by controller 605 possibly under control of operating system 615. For example, executable code 625 may be an application for identifying plant rows from an image, segmenting such plant rows and/or distinguishing between planted and non-planted rows. Where applicable, executable code 625 may carry out operations described herein in real-time. Computing device 600, controller 605 and executable code 625 may be configured to update, process and/or act upon information at the same rate the information, or a relevant event, are received. In some embodiments, more than one computing device 600 may be used. For example, a plurality of computing devices that include components similar to those included in computing device 600 may be connected to a network and used as a system. For example, identifying plant rows, segmenting such rows and/or distinguishing between planted and non-planted rows may be performed in realtime by executable code 625 when executed on one or more computing devices such computing device 600.

Storage 630 may be or may include, for example, a hard disk drive, a floppy disk drive, a Compact Disk (CD) drive, a CD-Recordable (CD-R) drive, a universal serial bus (USB) device or other suitable removable and/or fixed storage unit. Contents may be stored in storage 630 and may be loaded from storage 630 into memory 620 where it may be processed by controller 605. In some embodiments, some of the components shown in FIG. 6 may be omitted. For example, memory 620 may be a non-volatile memory having the storage capacity of storage 630. Accordingly, although shown as a separate component, storage 630 may be embedded or included in memory 620.

Input devices 635 may be or may include a mouse, a keyboard, a touch screen or pad or any suitable input device. It will be recognized that any suitable number of input devices may be operatively connected to computing device 600 as shown by block 635. Output devices 640 may include one or more displays, speakers and/or any other suitable output devices. It will be recognized that any suitable number of output devices may be operatively connected to computing device 600 as shown by block 640. Any applicable input/output (I/O) devices may be connected to computing device 600 as shown by blocks 635 and 640. For example, a wired or wireless network interface card (NIC), a modem, printer or facsimile machine, a universal serial bus (USB) device or external hard drive may be included in input devices 635 and/or output devices 640.

Embodiments of the invention include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, embodiments of the invention include a storage medium such as memory 620, computer-executable instructions such as executable code 625 and a controller such as controller 605.

Some embodiments may be provided in a computer program product that may include a non-transitory machine-readable medium, stored thereon instructions, which may be used to program a computer, or other programmable devices, to perform methods as disclosed herein. Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including floppy disks, optical disks, compact disk read-only memories (CD-ROMs), rewritable compact disk (CD-RWs), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EE- PROMs), magnetic or optical cards, or any type of media suitable for storing electronic instructions, including programmable storage devices.

A system according to embodiments of the invention includes components such as, but not limited to, a plurality of central processing units (CPU) or any other suitable multipurpose or specific processors or controllers, a plurality of input units, a plurality of output units, a plurality of memory units, and a plurality of storage units. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device. Unless explicitly stated, the method embodiments described herein are not constrained to a particular order or sequence. Additionally, some of the described method embodiments or elements thereof can occur or be performed at the same point in time.

Figure 7:
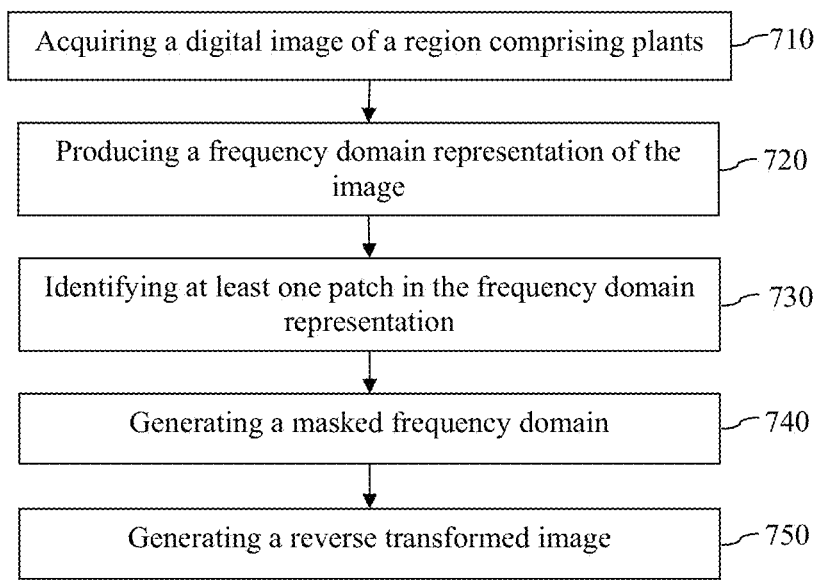
FIGS. 7 and 8 are exemplary flowcharts describing methods of identifying plant rows according to embodiments of the invention.

Reference is now made to FIG. 7, an exemplary flowchart describing a method of identifying plant rows according to embodiments of the invention. As shown by block 710, the method may include acquiring a digital image of a region including plants. Any suitable image acquisition device or system may be used to acquire an image as shown by block 710. As shown by block 720, the method may include producing a frequency domain of the digital image. As shown by block 730, the method may include identifying at least one patch in the frequency domain representation. As detailed herein, such a patch may correspond to plant rows in the spatial domain. As shown by block 740, the method may include generating a masked frequency domain, thereby removing all frequencies outside the identified patch. As shown by block 750, the method may include generating a reverse transformed image. As detailed herein, such a reverse transform of the masked frequency domain may provide a spatial domain image comprising only physical data corresponding to the chosen frequency patch. Since the patch may correspond to plant rows, the reverse transform may provide an image including only such rows.

Figure 8:
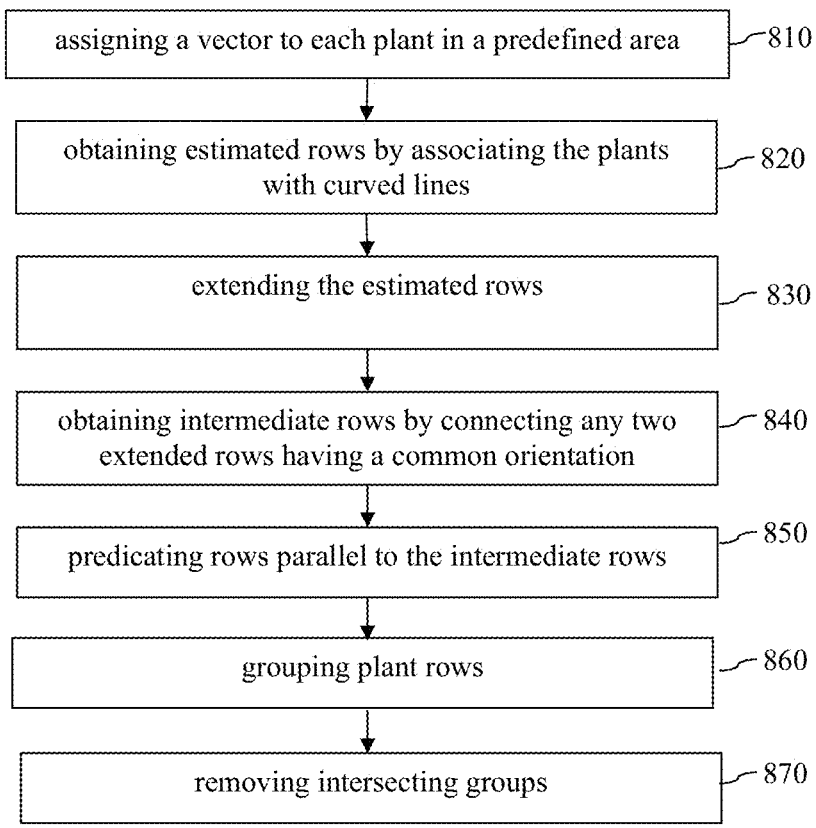

Reference is now made to FIG. 8, an exemplary flowchart describing a method of identifying plant rows according to embodiments of the invention. As shown by block 810, the method may include assigning a vector to each plant in a predefined area. A vector may be, for example, an entity having both a length (relating to the size or magnitude of the vector) and a direction. The vectors may be assigned according to the position of the plant, the position of its neighbors, the distance between the plant and its neighbors and the directed of a line formed by the plants and the neighbors thereof. As shown by block 820, the method may include determining or obtaining estimated rows by associating the plants with curved lines according to the vectors assigned to each plant. As shown by block 830, the method may include extending the estimated rows in the direction defined by the curved lines. As shown by block 840, the method may include obtaining intermediate rows by defining a line connecting any two extended rows having a common orientation. According to some embodiments, any two extended rows are connected by a line when the plants positioned on that line have a predefined density. As shown by block 850, the method may include predicating rows parallel to the intermediate rows. As shown by block 860, the plant rows are grouped. The plant rows may be split into groups according to their distance from one another and/or their relative direction. As shown by block 870, intersecting groups may be removed.

Figure 9:
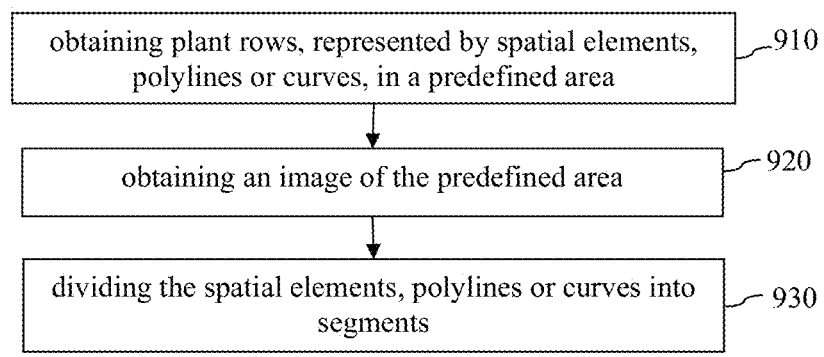
FIG. 9 is an exemplary flowchart describing a method of dividing plant rows into segments according to embodiments of the invention.

In order to improve sub-area classification, e.g., sub-areas relating to tree rows, sub-areas (portions or areas of the image) obtained according to any appropriate method may be further divided into segments (portions or areas of the image) according to any appropriate classification relating to attributes of an image of an area in which the sub-areas may be found. Reference is now made to FIG. 9, an exemplary flowchart describing a method of dividing plant rows according to predefined classification. The plant rows may be divided such that anomalies in the field, such as unplanted regions. As shown by block 910, the method may include obtaining a representation of plant rows in a predefined area. According to some embodiments, the plant rows are represented by spatial elements, polylines or curves.

For example, tree rows, detected and represented by any appropriate means, including, though not limited to, those detailed above, may be further segmented according to certain, predetermined, classifications relating to attributes of the image. Each row containing a certain type of segment may then be denoted accordingly. Such a procedure would result in the creation of a number of classified populations, thus improving the accuracy of any type of statistical extrapolation performed on the data. As shown in block 920, the method may include obtaining an image of a predefined area. For example, a forest image may be obtained and analyzed in order to detect anomalies. Any number of anomaly classes may be defined, such as an area without trees, non-planted rows and partial planted rows. The anomalies may be classified using any types of appropriate statistical clustering methods, domain-specific forestry knowledge or any other appropriate method. The anomalies in the image may be, for example, delineated, for example, with polygons. As shown in block 903, the spatial elements, polylines or curves representing the tree rows may be divided into segments according to their relation to the polygons identified in the image. For example, tree rows may be represented in the image as polylines and the various segments thereof may be classified according to the polygons those segments may be contained within.

For example, an image containing sub-areas, such as tree rows, represented, e.g., by polylines, may be analyzed. The areas of anomaly in the image may be extracted by comparison to normal areas dominating the entire image. The image may be analyzed using any appropriate algorithm, such as color segmentation, and the area of each detected anomaly may be bound by a polygon according to measured attributes, which may be, for example, color levels, gray levels etc. Each anomaly may then be evaluated by a set of rules in order to classify each anomaly into a specific class, belonging to a set of classes. For example, one such anomaly class may be defined as "failure", which may denote an area without trees. Once the anomalies are bound by polygons and are classified, the sub-areas, e.g., tree rows, may be classified according to the portions thereof found within the polygons. The sub-areas, e.g., tree rows, possibly presented by polylines, may accordingly be classified into two sets: normal sub-areas, fully residing in non-anomaly areas, e.g., fully outside the anomaly polygon areas, and abnormal sub-areas, which, at least partially, reside in any one of the anomaly polygons. The abnormal sub-areas, or portions thereof, may be further classified according to the classification and/or attributes of the specific anomaly polygon they reside within. Thus, the final output may be a set of polylines in. Shape file format, each having a classifying value. According to some embodiments, rows that traverse an anomaly may be identified and eliminated.

In some instances, sub-area detection of areas, such as tree rows, may provide partially false data, due, for example, to non-planted rows in a forest, such as fire rows, trash rows, wind rows and the like, which may appear, using the above algorithms, as planted tree rows. Thus, there may be a need to distinguish such unplanted rows from planted rows.

Figure 10:
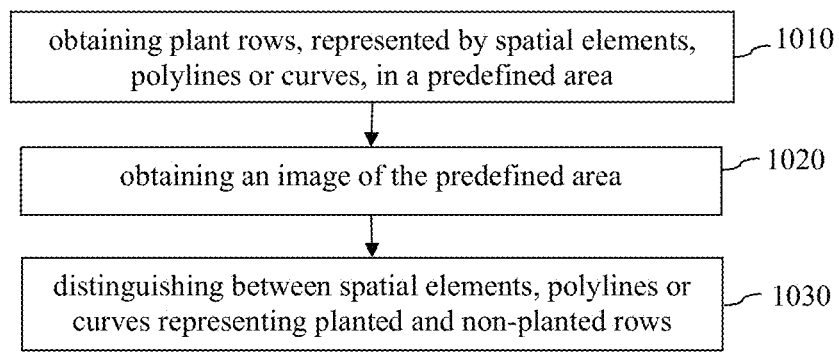
FIG. 10 is an exemplary flowchart describing a method of distinguishing between planted and non-planted rows according to attributes derived from an image.

Reference is now made to FIG. 10, presenting an exemplary flowchart describing a method of distinguishing between planted and non-planted rows according to attributes derived from an image. As shown by block 1010, the method may include obtaining a representation of plant rows in a predefined area. According to some embodiments, the plant rows are represented by spatial elements, polylines or curves. As shown in block 1020, the method may include obtaining a digital image.

As shown in block 1030, the method may include distinguishing between planted and non-planted rows according to attributes derived from the image. According to some embodiments, unplanted rows are distinguished from tree rows using a height data to classify tree rows according to their height attributes. Height may be used since, presumably, the height of tree rows may be significantly higher than that of non-planted rows. Thus, height may be used in order to identify rows that are planted and non-planted, possibly eliminating non-planted rows from the identified rows.

According to some embodiments, a height database is generated from data obtained from the image of the entire field. The height database may be a set of three data columns, wherein each row representation includes point locations on the image (x,y) and height (z). Any appropriate reader, such as Text parser, may transform the (x,y,z) data into a process ready internal format. According to some embodiments, graphical tools are used, e.g., to represent the different height areas in different colors. For example, height may be represented in grey-scale, e.g., wherein lower areas may be darker than higher ones.

Basic height primitives may be assigned to the database to represent a geometric property. Locations, where a linear section may potentially be found, may be classified as linear segments. Intersections of linear segments may be classified as junctions. Linear primitives may be assigned to locations where a narrow dark segment may be located in a bright area that may be automatically detected. Each primitive may be assigned with a specific direction attribute (vertical, horizontal or diagonal). Intersection primitives may be set to locations where narrow dark segments may be intersected. The intersection primitives may assigned with a horizontal or diagonal direction.

Once the height primitives may be assigned to the dark, e.g., ground level, segments, they may be converted into geometric elements representing lines and polylines. Any appropriate optimization engine may be used to combine primitives having the same direction attributes into linear elements. The optimization engine may, iteratively, combine primitives having the same direction attributes, adding them to partial linear elements comprising other primitives having the same direction, thus obtaining linear segments. Junction primitives share two potential directions and therefore, may be added to different partial linear elements. The optimization may continue until the linear segments are extended, such that the changes per iteration may be smaller than a pre-defined threshold. The obtained linear segments (lines/polylines) may represent lines/rows, having ground altitude, thereby representing areas where no trees exist, thus aiding in determining the actual locations of planted rows.

The obtained linear segments may be combined with the tree row data obtained according to any appropriate method, including the methods detailed above. When there is a correlation between the linear segments representing ground altitude rows and the previously detected tree rows, the tree rows may be modified to remove the correlating segments, thereby leaving only rows that may be higher than ground level, thereby representing areas wherein planted tree rows exist. Thus, the actual location of planted rows may be determined According to some embodiments, each original row is analyzed to measure the percentage thereof that was identified as non-planted. Such a measurement may be used to determine the likelihood of the entire row being planted or non-planted. For example, if the non-planted part of a row is larger than a pre-defined threshold, which may be, for example, either an absolute length threshold of a relative proportion threshold, the entire row may be classified as non-planted.

According to other embodiments, planted rows are differentiated from non-planted rows by colors and/or patterns found in an image of the area containing the rows. Accordingly, the image of the entire field may be analyzed for color and/or pattern specifics, wherein each location in the image may be assigned with color and/or pattern signatures. The signatures may be evaluated by any appropriate segmentation engine, which may generate bounding polygons for any image segment having similar color and/or pattern signatures. For example, planted rows may be defined by ordered, regular patterns, thus, polygons containing such patterns may be classified as potentially rows. Accordingly, row polylines that are partially included in "potentially row" polygons may be added, while others, may be removed.

According to some embodiments, the differentiation between planted and non-planted rows may include any type of combination, such as weighted combination, between the above methods, including height determination and/or color and/or pattern determination.

Figure 11:
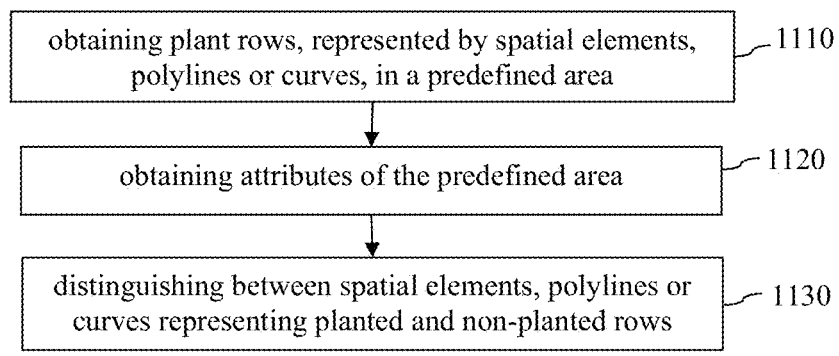
FIG. 11 is an exemplary flowchart describing a method of distinguishing between planted and non-planted rows according to attributes not derived from an image.

Reference is now made to FIG. 11, presenting an exemplary flowchart describing a method of distinguishing between planted and non-planted rows according to attributes that are not derived from an image. As shown by block 1110, the method may include obtaining a representation of, e.g., data representing, plant rows in a predefined area. According to some embodiments, the plant rows are represented by spatial elements, polylines or curves. As shown in block 1120, the method may include obtaining attributes of the predefined area, wherein the attributes are not derived from an image. As shown in block 1130, planted and non-planted rows may be distinguished from one another according to such attributes. According to some embodiments, the representation of tree rows may be divided into segments according to any attributes of the various segments, such as height, surface color, vegetation class, soil data and the like, derived from any appropriate engine, not from the image of the area, region or field. For example, the representation of tree rows may be divided into segments according to their height. The tree canopies and/or tops may be represented by a surface model, derived by any known method, which may be used to divide and classify the row polylines into polyline segments having a fixed average height. In order to perform such a classification, the surface model, containing height data of the image of the entire field, may be translated into bitmap representation, where each location has a specific height, thereby obtaining a height bitmap. The row polylines may be overlapped with the height bitmap, such that the height information may be attached to the polylines using any appropriate method, such as a best-fit method. A database containing height information may be generated, wherein each entry in the database may be a polyline having a certain height attribute, thus, classified rows/row segments may be obtained.

Unless explicitly stated, the method embodiments described herein are not constrained to a particular order or sequence. Additionally, some of the described method embodiments or elements thereof can occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, various embodiments presented are combinable with the other embodiments disclosed herein, and embodiments not specifically described may include various features described herein.

What is claimed is:

1. A method comprising:
producing, by a processor, a frequency domain representation of a digital image comprising plants and identifying at least one desired patch in said frequency domain representation, according to predefined frequency characteristics of said desired patch;
removing, by the processor, all frequencies outside said desired patch to obtain a masked frequency domain; and
reverse transforming, by the processor, said masked frequency domain to obtain a reverse transformed image comprising spatial elements representing plant rows corresponding to said desired patch;
wherein said predefined frequency characteristics comprise:
at least one dominant frequency value;
at least one predefined frequency characteristic corresponding to at least one predefined spatial characteristic relating to at least one attribute of said plants; or
any combination thereof,
and wherein the attribute includes one of: planted row spacing, spacing between plants on the same row and direction of plant rows.

2. The method according to claim 1, further comprising:
stretching said reverse transformed image to obtained a stretched image;
converting said stretched image to a single band image comprising black connected pixel components; and
transforming said black connected pixel components to a pattern of sub-area polylines representing plant rows.

3. A device comprising:
a memory to store a representation of plant rows in a predefined area; and
a processor configured to:
produce a frequency domain representation of the representation and identifying at least one desired patch in said frequency domain representation, according to predefined frequency characteristics of said desired patch;
remove all frequencies outside said desired patch to obtain a masked frequency domain; and
reverse transform, by a computing device, said masked frequency domain to obtain a reverse transformed image comprising spatial elements representing plant rows corresponding to said desired patch;
wherein said predefined frequency characteristics comprise:
at least one dominant frequency value;
at least one predefined frequency characteristic corresponding to at least one predefined spatial characteristic relating to at least one attribute of said plants; or
any combination thereof,
and wherein the attribute of said plant is planted row spacing, spacing between plants on the same row, direction of plant rows, typical row samples manually marked on the aerial image providing any of the above attributes, or any combination thereof.

4. The device according to claim 3, further comprising causing the processor to:
stretch said reverse transformed image to obtained a stretched image;
convert said stretched image to a single band image comprising black connected pixel components; and
transform said black connected pixel components to a pattern of sub-area polylines representing plant rows.

5. A method comprising:
receiving, by a processor, a representation of plants in a predefined area;
assigning, by the processor, a vector to each plant in the representation according to its position, the position of neighbor plants, the distance between said plant and said neighbor plants, and the direction of a line formed by said plants and said neighbor plants;
associating, by the processor, the plants with curved lines, according to said vectors, to obtain estimated rows;
extending, by the processor, the estimated rows in the direction defined by the curved lines, to obtain extended rows;
defining, by the processor, a line connecting a first and second extended row having a common orientation, when the plants positioned on said line have a predefined density to obtain intermediate rows having a position and an orientation;
predicating, by the processor, rows parallel to any one of the intermediate rows, according to said position and orientation of intermediate rows, to obtain predicated parallel plant rows;
grouping, by the processor, plant rows, comprising intermediate plant rows and predicated parallel plant rows, into groups; and
removing, by the processor, intersecting groups, thereby obtaining plant rows.

6. The method according to claim 5, further comprising
building a local directions map by dividing the predefined area into cells;
determining the dominant direction of the plants in each cell, thereby obtaining plant directions;
reiterating the method of claim 5, wherein the vectors are reevaluated according to said plant directions.

7. A device comprising:
a memory to a representation of plants in a predefined area; and
a processor configured to:
assign a vector to each plant in the representation according to its position, the position of neighbor plants, the distance between said plant and said neighbor plants, and the direction of a line formed by said plants and said neighbor plants;
associate the plants with curved lines, according to said vectors, to obtain estimated rows;

extend the estimated rows in the direction defined by the curved lines, to obtain extended rows;

define a line connecting a first and second extended row having a common orientation, when the plants positioned on said line have a predefined density to obtain intermediate rows having a position and an orientation;

predicate rows parallel to any one of the intermediate rows, according to said position and orientation of intermediate rows, to obtain predicated parallel plant rows;

group plant rows, comprising intermediate plant rows and predicated parallel plant rows, into groups; and remove intersecting groups, thereby obtaining plant rows.

8. The device according to claim 7, further comprising causing the processor to:

build a local directions map by dividing the predefined area into cells;

determine the dominant direction of the plants in each cell, thereby obtaining plant directions;

reiterating the steps of claim 7, wherein the vectors are reevaluated according to said plant directions.

9. A method comprising storing in a memory a representation of plant rows in a predefined area, wherein the plant rows are represented by spatial elements corresponding a at least one frequency patch, polylines or curves;

obtaining, by an image acquisition system, an image of said pre-defined area;

dividing, by a processor, said spatial elements, polylines or curves into segments according to pre-defined classifications relating to attributes of said image.

10. The method according to claim 9, wherein the attributes are color levels or gray levels.

11. A device comprising:

a memory having stored thereon:

a representation of plant rows in a predefined area, wherein the plant rows are represented by spatial elements corresponding a at least one frequency patch, polylines or curves; and an image of said predefined area;

and a processor configured to:

divide said spatial elements, polylines or curves into segments according to pre-defined classifications relating to attributes of said image.

12. The device according to claim 11, wherein the attributes are color levels or gray levels.

13. A method comprising storing in a memory a representation of plant rows in a predefined area, wherein the plant rows are represented by spatial elements corresponding a at least one frequency patch, polylines or curves;

obtaining, by an image acquisition system, an image of said pre-defined area; and distinguishing, by a processor, between spatial elements, polylines or curves representing planted and non-planted rows according to height attributes derived from said image, color of areas in said image, pattern of areas in said image or any combination thereof.

14. The method according to claim 13, wherein the height attributes include linear segments representing ground altitude rows.

15. A device comprising:

a memory having stored thereon:

a representation of plant rows in a predefined area, wherein the plant rows are represented by spatial elements corresponding a at least one frequency patch, polylines or curves; and an image of said predefined area;

and a processor configured to:

distinguish between spatial elements, polylines or curves representing planted and non-planted rows according to height attributes derived from said image, color of areas in said image, pattern of areas in said image or any combination thereof.

16. The device according to claim 15, wherein the height attributes include linear segments representing ground altitude rows.

17. A method comprising storing in a memory a representation of plant rows in a predefined area, wherein the plant rows are represented by spatial elements corresponding a at least one frequency patch, polylines or curves;

obtaining attributes of said predefined area comprising height, surface color, vegetation class, soil data or any combination thereof; and distinguishing, by a processor, between spatial elements, polylines or curves representing planted and non-planted rows according to said attributes;

wherein the attributes are not derived from an image of said predefined area.

18. The method according to claim 17, wherein said attributes are obtained from a surface model containing height data.

19. A device comprising:

a memory having stored thereon:

a representation of plant rows in a predefined area, wherein the plant rows are represented by spatial elements corresponding a at least one frequency patch, polylines or curves; and attributes of said predefined area comprising height, surface color, vegetation class, soil data or any combination thereof;

and a processor configured to:

distinguish between spatial elements, polylines or curves representing planted and non-planted rows according to said attributes, wherein the attributes are not derived from an image of said predefined area.

20. The device according to claim 19, wherein said attributes are obtained from a surface model containing height data.

* * * * *